United States Patent [19]
Cheng

[11] Patent Number: 6,062,588
[45] Date of Patent: May 16, 2000

[54] FOLDING STRUCTURE FOR A COLLAPSIBLE STROLLER

[75] Inventor: Ying-Hsiung Cheng, Tainan Hsien, Taiwan

[73] Assignee: Pao-Hsein Cheng, Tainan Hsien, Taiwan

[21] Appl. No.: 09/129,634

[22] Filed: Aug. 5, 1998

[51] Int. Cl.⁷ .................................................. B62B 7/08
[52] U.S. Cl. .................. 280/642; 280/647; 280/650; 403/102
[58] Field of Search ...................... 280/639, 642, 280/38, 42, 647, 651, 657, 658, 47.34, 47.35, 47.371, 47.38, 47.41; 403/101, 102

[56] References Cited

U.S. PATENT DOCUMENTS

| 5,388,852 | 2/1995 | Bigo et al. | 280/642 |
| 5,454,584 | 10/1995 | Haut et al. | 280/642 |
| 5,553,885 | 9/1996 | Chang | 280/642 |
| 5,605,409 | 2/1997 | Haut et al. | 403/102 |
| 5,755,455 | 5/1998 | Chen et al. | 280/642 |
| 5,845,924 | 12/1998 | Huang | 280/642 |
| 5,876,057 | 3/1999 | Huang | 280/642 |
| 5,887,889 | 3/1999 | Andrus | 280/647 |
| 5,911,431 | 6/1999 | Brown et al. | 280/642 |
| 5,934,153 | 8/1999 | Yang | 74/551.3 |
| 5,938,230 | 8/1999 | Huang et al. | 280/650 |

*Primary Examiner*—Brian L. Johnson
*Assistant Examiner*—Bridget Avery
*Attorney, Agent, or Firm*—Rosenberg, Klien & Lee

[57] ABSTRACT

A folding, structure for a collapsible stroller of the present invention has a pair of pivotal connectors, a pushing handle, two front support rods, two rear support rods, a pair connecting holder blocks, a chair back frame and two connecting rods. The pivotal connectors pivot the pushing handle, the front support rods and the rear support rods. The connecting rods with one end respectively pivot to the pushing handle and the front support rods and with the other end pivot to the connecting holder blocks. The chair back frame also pivots to the connecting holder blocks. Each of the rear support rods has an obstructing protrusion and pivots the connecting holder block. Each connecting holder block has a press block, the first press bar, the second press bar, a hole, the first sloped guide surface and the second sloped guide surface. The connecting holder block is movably connected with each of the rear support rods of the stroller, the obstructing protrusion blocks and prevents the connecting holder block from sliding down for keeping the stroller extended. The press block pivoted to the connecting holder block is for pushing and making the connecting holder block slide down by means of the first press bar pushing the obstructing protrusion which is inserted into the rear support rod and projects from the hole owing to the sliding down of connecting holder block and connects to the second sloped guide surface for blocking and avoiding pushing the press block unpurposely.

3 Claims, 8 Drawing Sheets

FOLDING STRUCTURE FOR A COLLAPSIBLE STROLLER

BACKGROUND OF THE INVENTION

A conventional known stroller, referring to FIG. 11, has two front wheel rods 71, two rear wheel rods 72, a U-shaped bed frame 74 connected to the front and the rear wheels rods 71, 72, two front wheels 711 and two rear wheels 721, a main connecting base 81 of a collapsible structure for collapsing fixed on top of each of the front wheel rods 71, an auxiliary connecting base 82 pivoted to each of the rear wheel rods 72. The auxiliary base 82 is connected with a push handle 75 at an upper end. A shade frame 76 is provided, supporting sun shade 77 and pivoted to the bed frame 74. A bed 78 is provided, which is supported by the U-shaped bed frame 74.

The auxiliary base 82 of the collapsible structure 8 has a push block 83 movable in its interior and urged by a spring 84, forcing a projection 831 of the push block 83 to engage in a tubular hole 811 of the main base 81 to combine the main base 81 and the auxiliary base 82 together.

However, though the above conventional stroller is convenient for a baby to lie thereon and can be collapsed to a small size for storing, it is found to have disadvantages as follows.

1. When the push block 83 is pressed, the stroller will be in a position ready for collapsing, i.e. if a user should press the push block 83 by accident while a baby is still lying on the bed of the stroller, the stroller might be collapsed unwarily and result in injury of the baby.

2. When the stroller is collapsed, only the rear wheels touch the ground, i.e. the collapsed stroller has be leaned over a wall or otherwise put lying on the ground and thus might get dirty very easily.

SUMMARY OF THE INVENTION

This invention has been deviced to offer a folding structure for a collapsible stroller, able to fix the collapsible structure of the stroller in its extended position for carrying a baby thereon without the risk of a mother accidentally collapsing the stroller while a baby is still lying thereon.

A main feature of the present invention is a provision of connecting holder blocks each equipped with a press block pivoted thereto, the first and the second press bars provided thereon, the first and the second sloped guide surfaces connect to rear supports rod. A hole corresponding to the second press bar is located on the connecting holder block for an obstructing protrusion protruding out of the rear support rod when the connecting holder block slides down as well as preventing the connecting holder block slides down while the press block is pushed unwarily by means of the obstructing protrusion is urged and inserted into the rear support rod by the first press bar of the press block.

Additionally, as there is no spring provided between the connecting holder block and the press block, the press block can not move back after the press block is pushed as well as due to the second press bar inserted into the hole blocks and connects with the obstructing protrusion so that the stroller is unable to be collapsed unless the user pulls out of the press block and pushes the press block again to collapse the stroller.

BRIEF DESCRIPTION OF DRAWINGS

The invention will be better understood by referring to the accompanying drawings, wherein.

DETAILED DESCRIPTION OF THE REFERRED EMBODIMENTS

Figure 1:
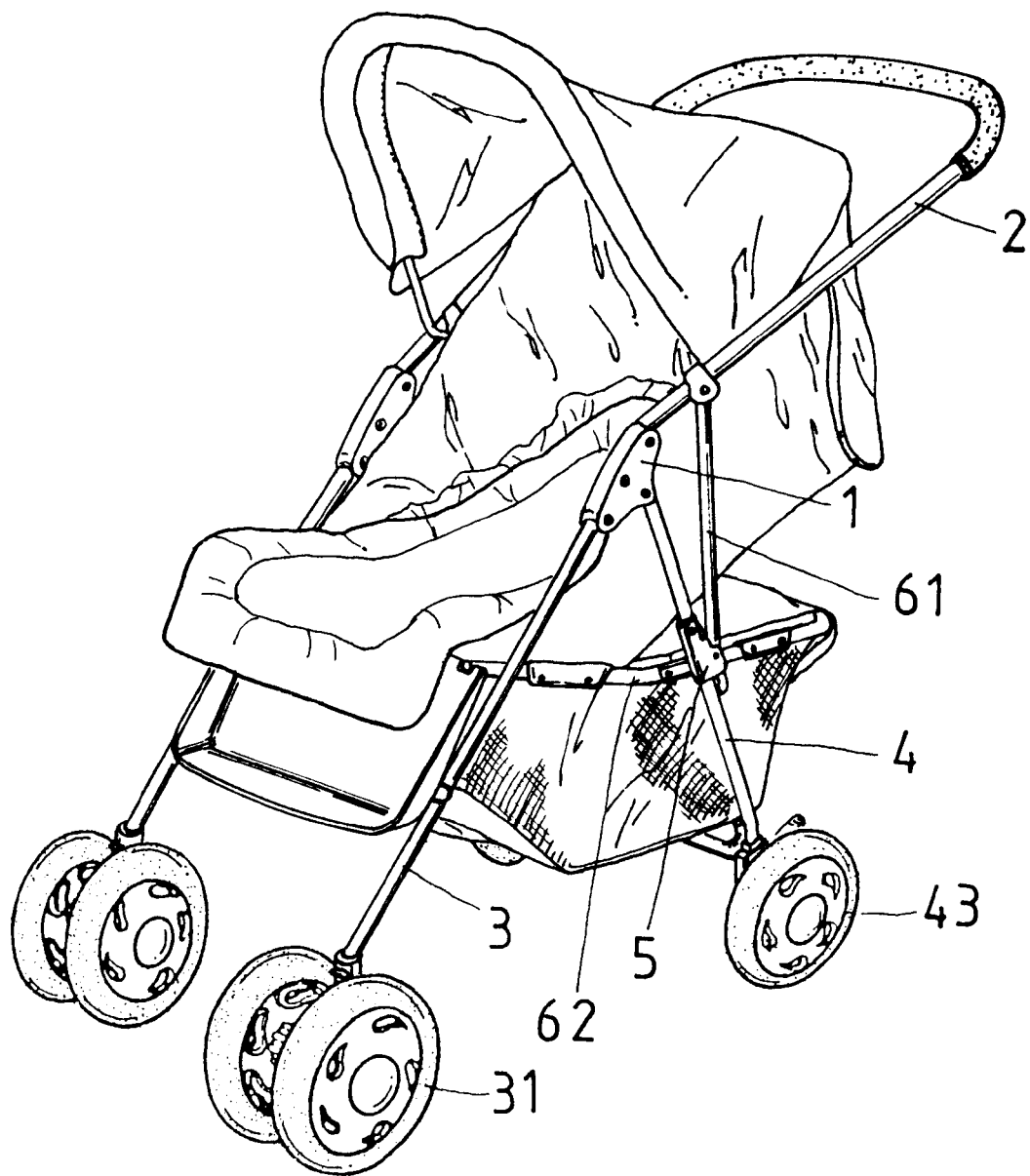
FIG. 1 is a perspective view of a collapsible stroller of the present invention.
Figure 2:
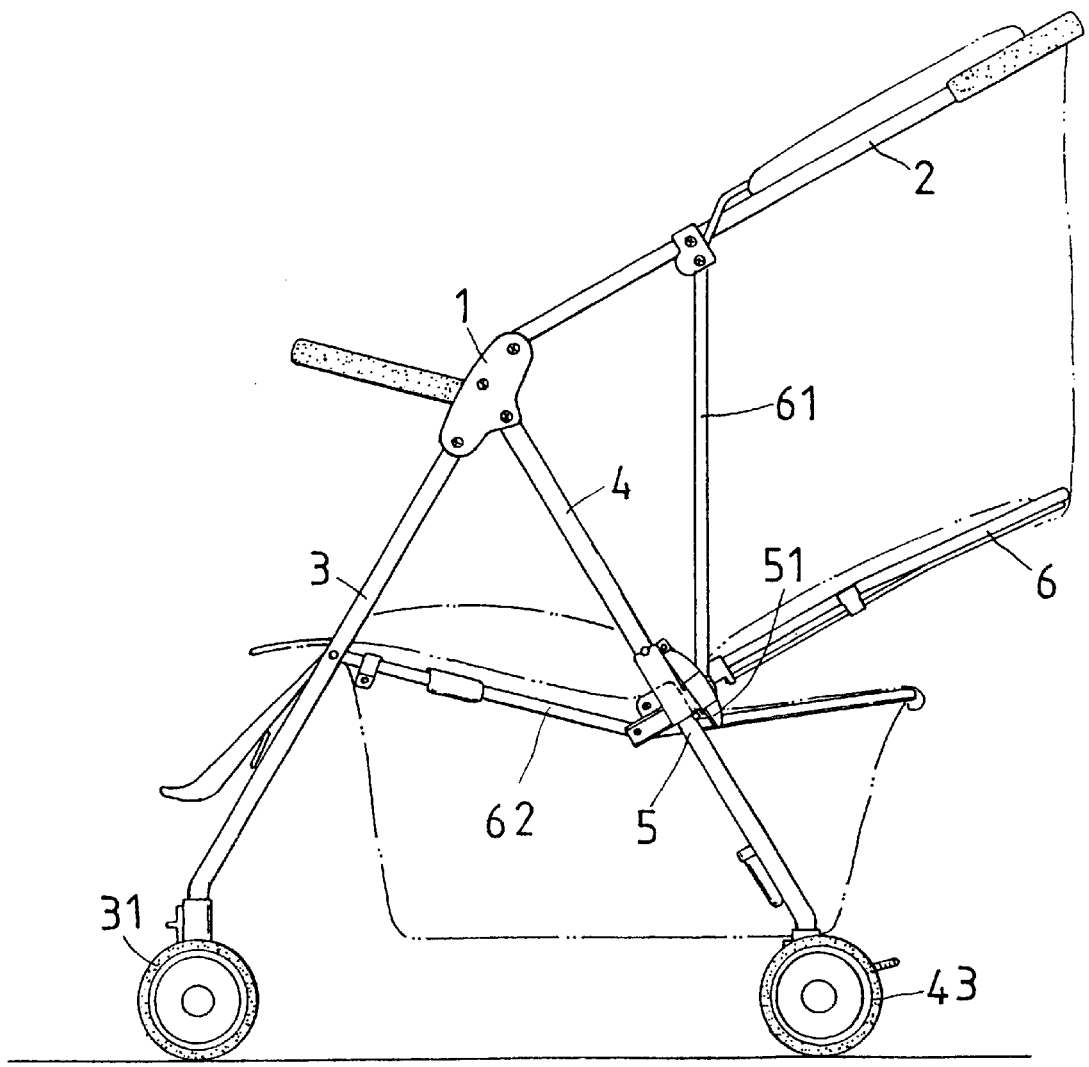
FIG. 2 is a side view of the collapsible stroller of the present invention.

A folding structure for a collapsible stroller of the present invention, referring to FIGS. 1–4, is provided.

The collapsible stroller of the present invention comprises two front support rods 3, two rear support rods 4, front wheels 31 connected to lower ends of the front support rods 3, rear wheels 43 connected to lower ends of the rear support rods 4, a pushing handle 2, a pair of pivotal connectors 1, a pair of connecting holder blocks 5 and a chair back frame 6. The front support rods 3 are pivoted to pivotal connectors 1 at upper ends thereof and the rear support rods 4 are also pivoted to the pivotal connectors 1 at upper ends thereof. Two connecting rods 61,62 with one end are respectively pivoted to the pushing handle 2 and the front support rods 3 and with the other end are pivoted to the connecting holder blocks 5.

Figure 5:
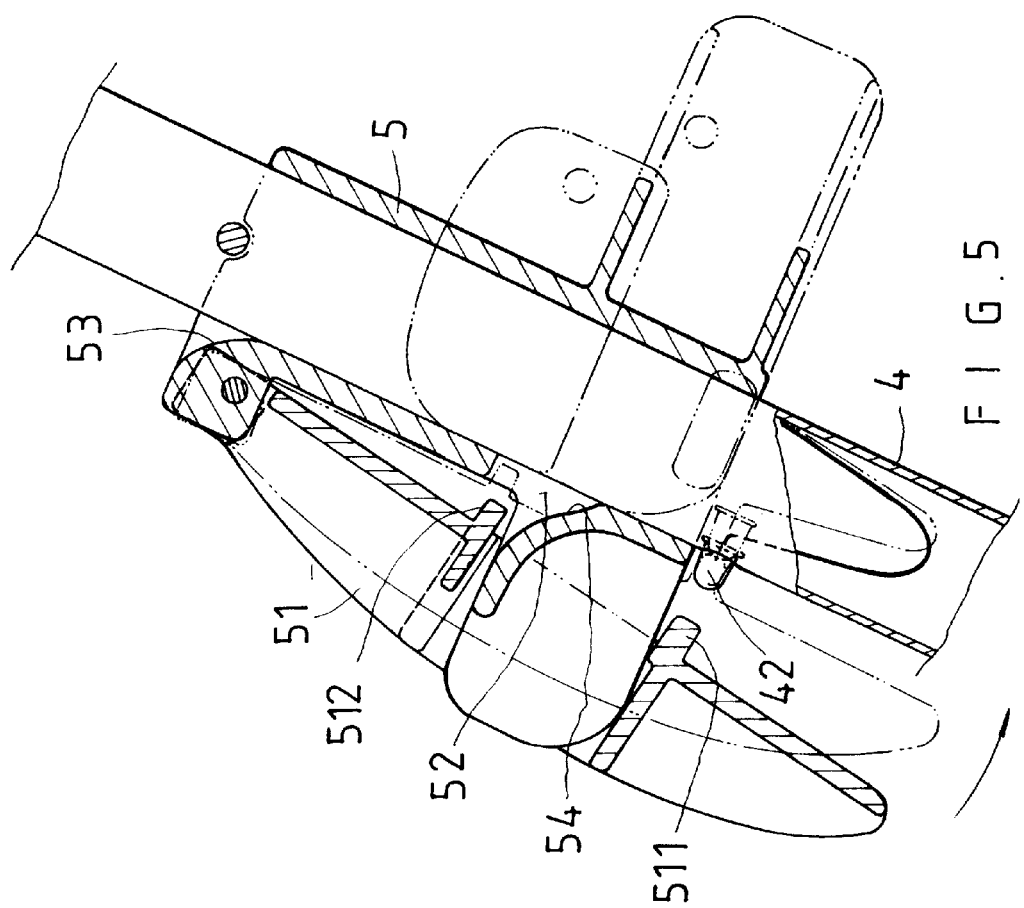
FIG. 5 is a cross-sectional view showing an obstructing protrusion is pushed by a press block and insert into a rear support rod.
Figure 3:
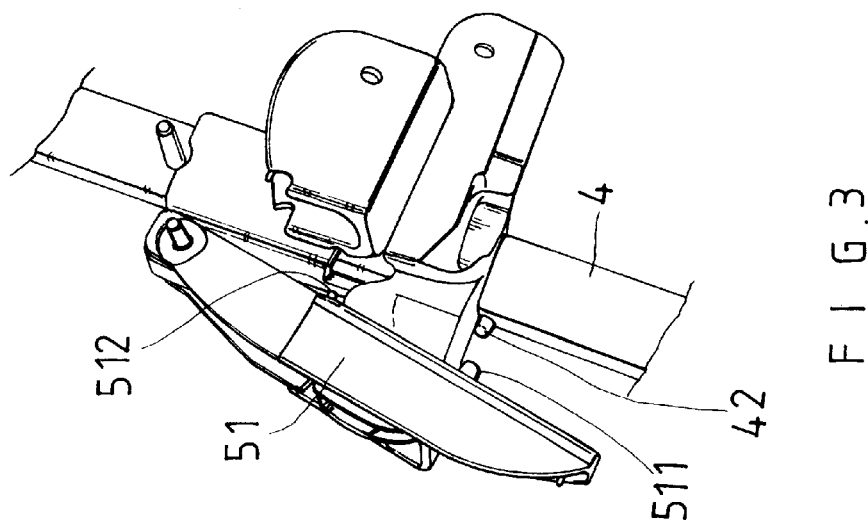
FIG. 3 is a perspective view of a connecting holder block of the present invention.

The connecting holder blocks 5 are movably connected to a respective one of the rear support rods 4, and each has an obstructing protrusion 42 urged by a reed, a hole 52, the first sloped guide surface 53, the second sloped guide surface 54, a press block 51, the first press bar 511, and the second press bar 512 as shown in FIG. 5.

The chair back frame 6 is pivotally connected to each of the two connecting holder blocks 5 for the chair of the stroller to be supported in a desired position and capable of being pivoted upward when the stroller is collapsed for storage by means of the device of the present invention that will be detailed hereunder.

Furthermore, each of the connecting holder blocks 5 is provided with the press block 51 pivoted to the connecting holder block 5 at its upper end. The press block 51 has the first bar 511 and the second press bar 512 to which the press block 51 connect. The connecting holder block 5 has the first sloped guide surface 53 and the second sloped guide surface 54 provided thereon. The hole 52 corresponding to the second press bar 512 is provided and positioned on the connecting holder block 5.

The obstructing protrusion 42 is fixed on the rear support rods 4 below the connecting holder block 5 when the stroller is extended condition as shown in FIG. 5. Moreover, the obstructing protrusion 42 is urged by a reed to protrude beyond the surface of the rear support rod 4 so that when a user pushes the press block 51 by accident and hence cause the obstructing protrusion 42 insert into the rear support rod 4 and then project from the hole 52 by means of sliding down of the connecting holder block 5 so that the connecting holder block 5 will be stopped by the obstructing protrusion 42 to prevent unwarily collapsing of the stroller and risk of hurting a baby lying on the stroller.

Figure 4:
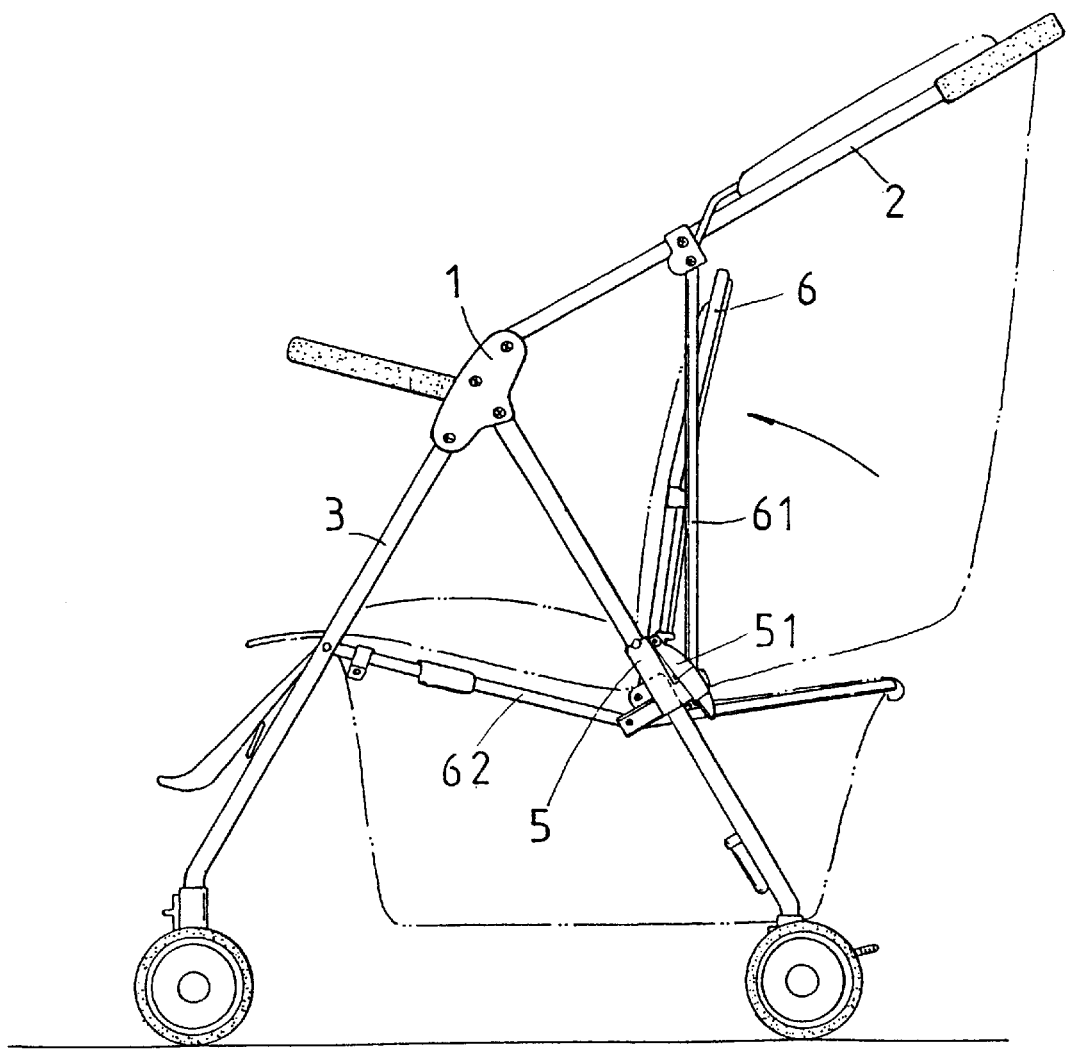
FIG. 4 is a side view showing the collapsing movement of the stroller of the present invention.
Figure 6:
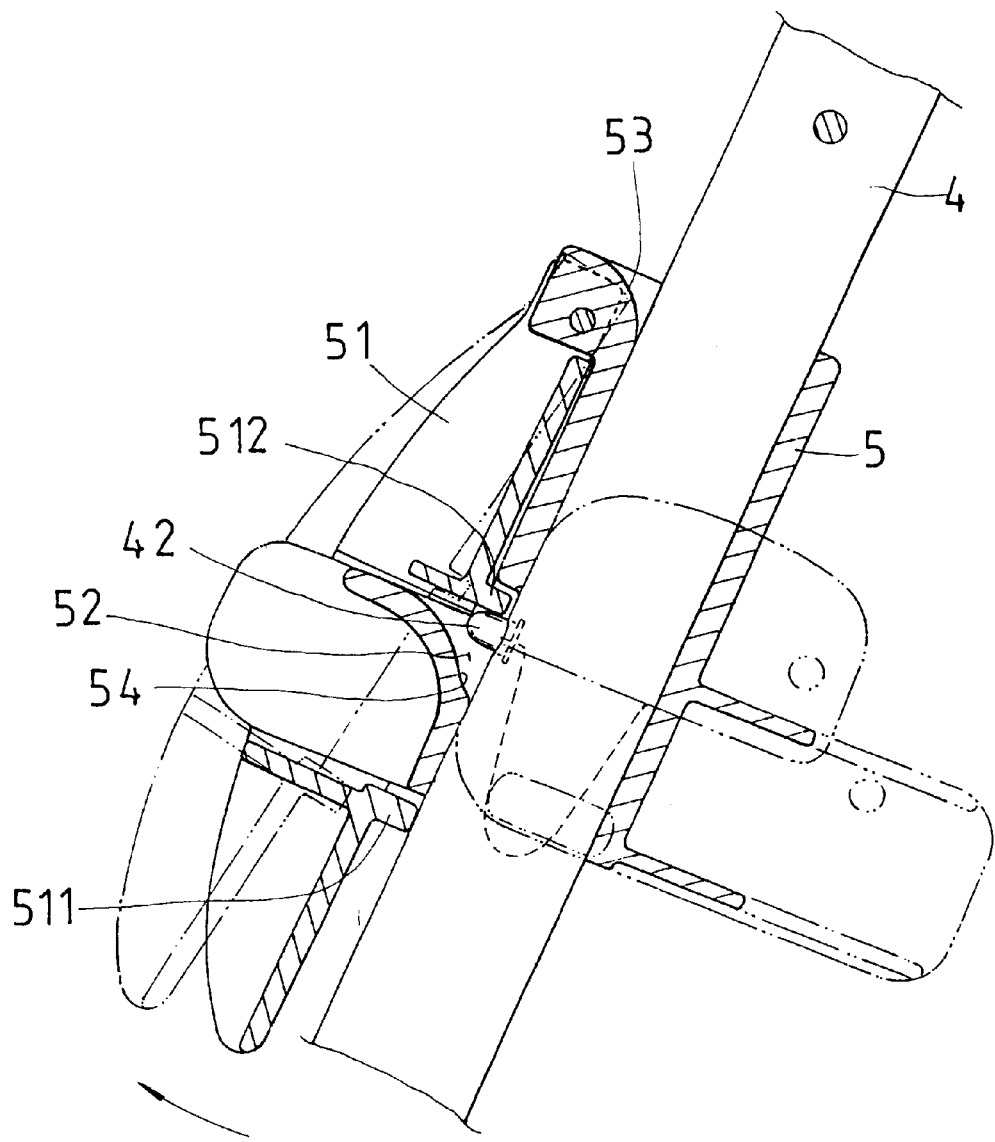
FIG. 6 is a cross-sectional view showing the press block is pulled out.
Figure 8:
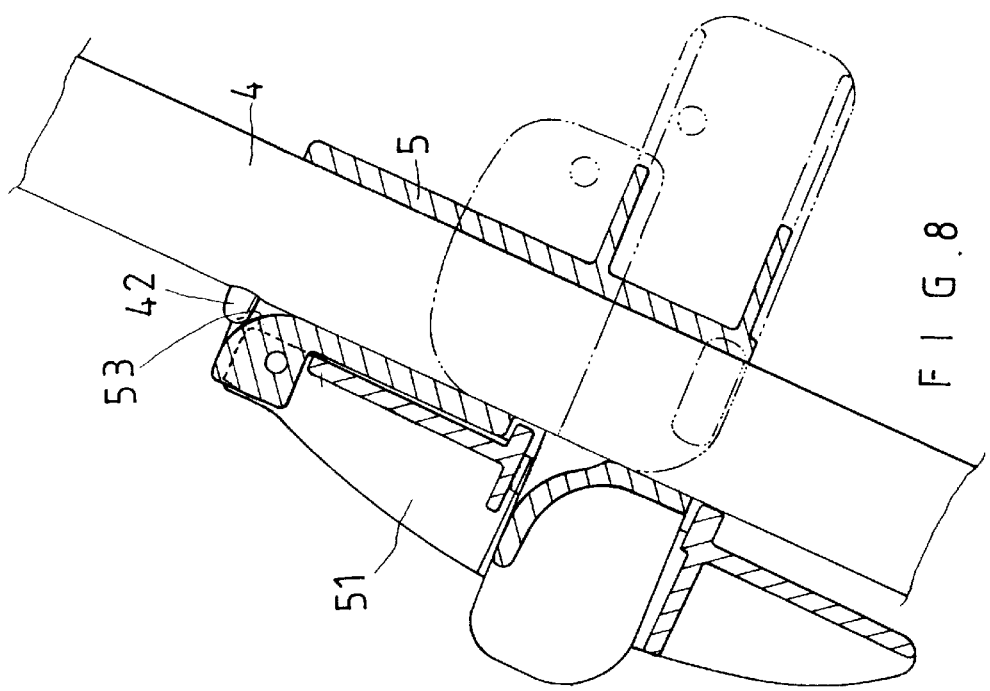
FIG. 8 is a cross-sectional view showing the connecting holder block slides down and the obstructing protrusion reach the first sloped guide surface.
Figure 7:
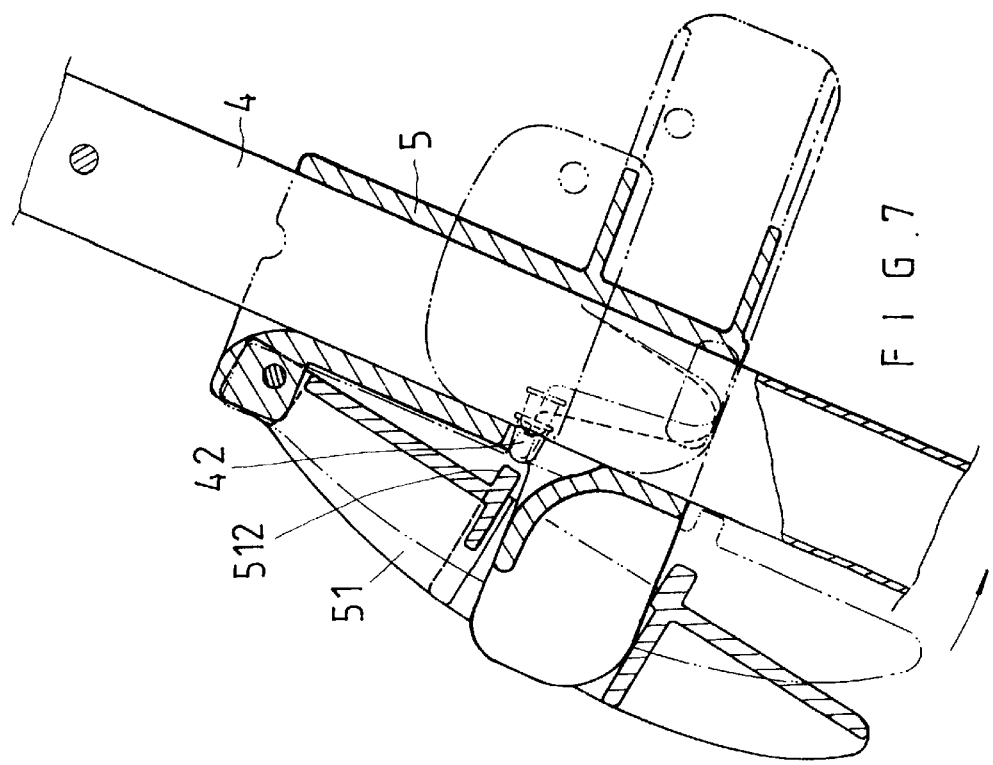
FIG. 7 is a cross-sectional view showing the obstructing protrusion is pushed again and insert into the rear support rod.
Figure 10:
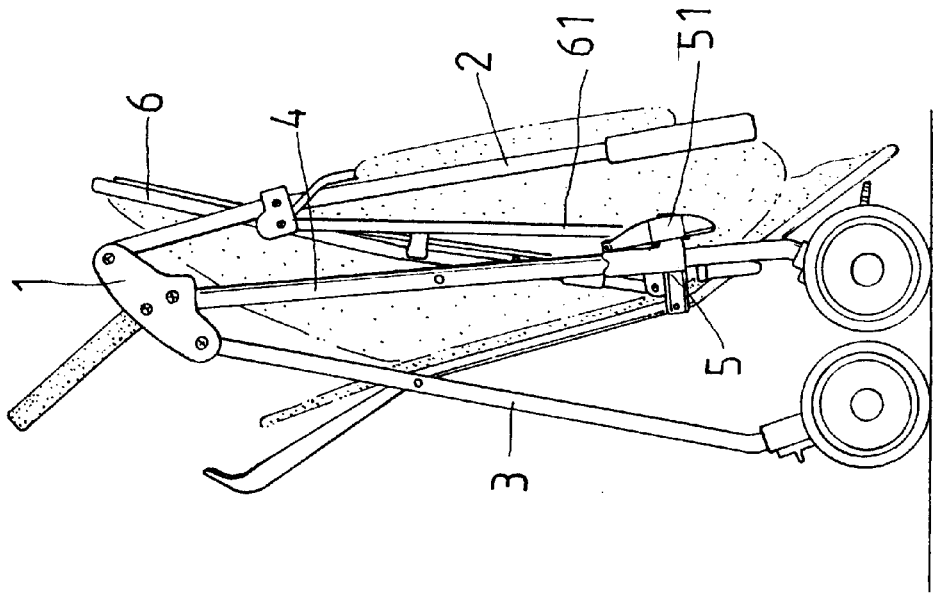
FIG. 10 is a side view of the collapsed collapsible stroller of the present invention; and, FIG. 11 is a side view of a conventional collapsible stroller as described in the background.
Figure 9:
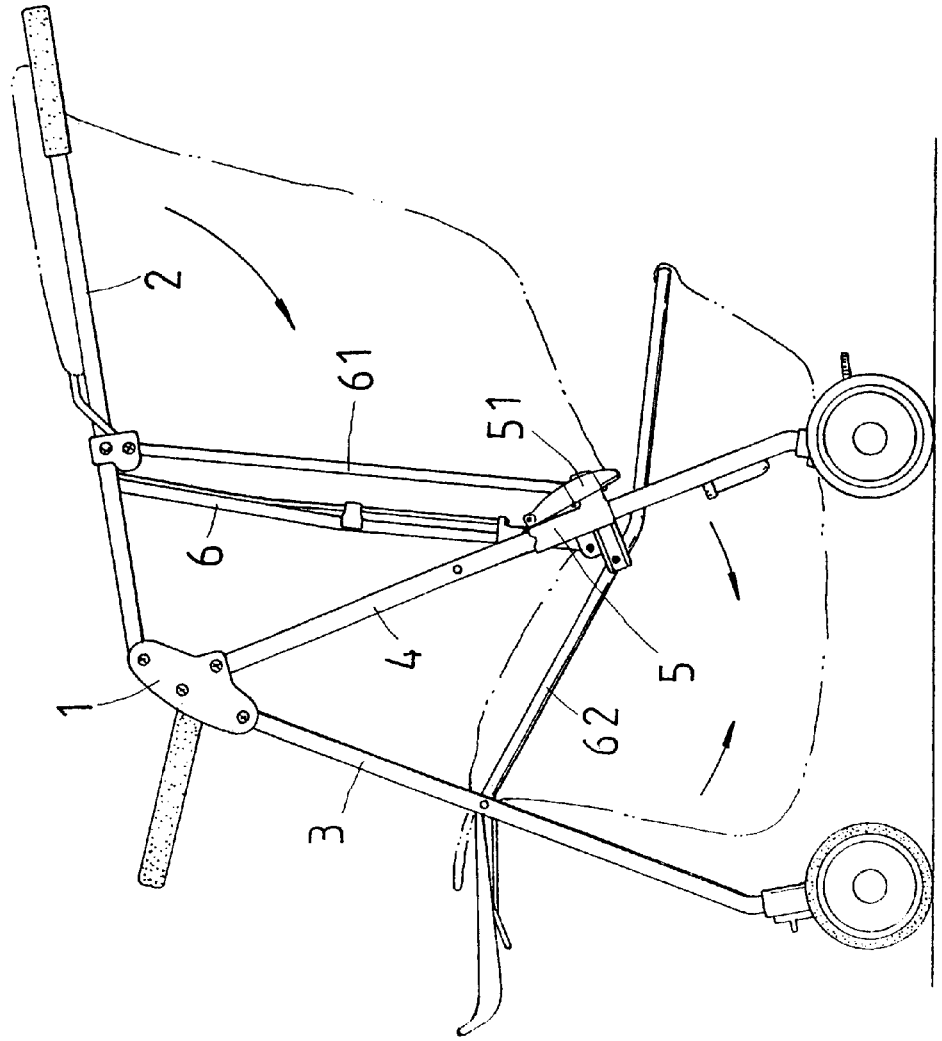
FIG. 9 is a side view showing a follow-on collapsing movement of the collapsible stroller of the present invention.
Figure 11:
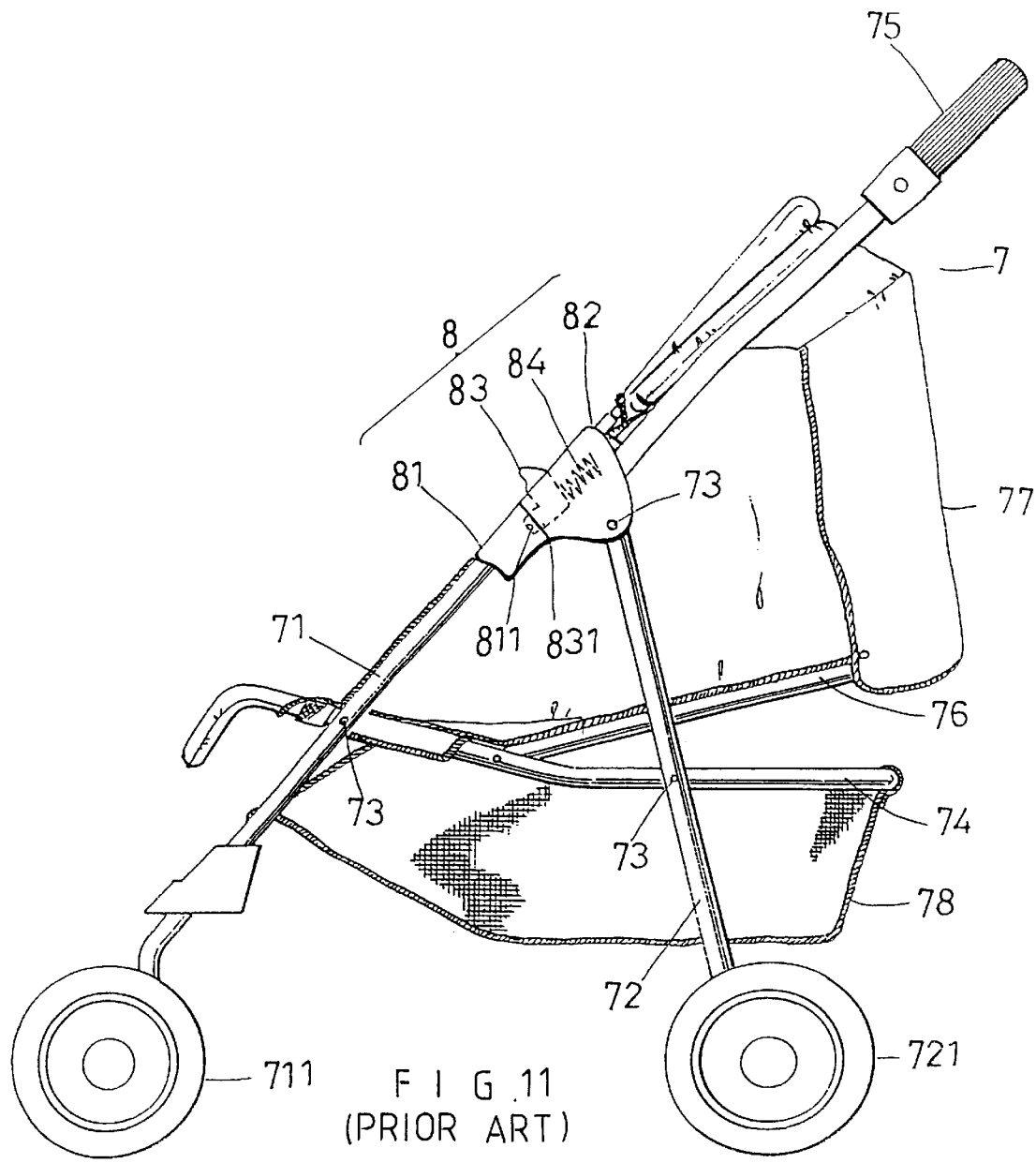

When a user wants to collapse the stroller for putting away, he or she can, referring to FIGS. 4 and 5, push the chair back frame 6 forward and then push the press block 51 directly. At this time, the first press bar 511 of the press block 51 correspond to the obstructing protrusion 42 and when the user pushes the press block 51, the obstructing protrusion 42 is urged by the first press bar 511 and insert into the rear support rod 4 so that the pushing handle 2 can be pushed downward as shown in FIG. 9 so as to make the connecting holder block 5 slides down and then the obstructing protrusion 42 projects from the hole 52, the second press bar 512 connects to the obstructing protrusion 42 as shown in FIG. 6 so that the connecting holder block 5 can be blocked and prevents from sliding down. Then the user pulls out the press block 51 to make the obstructing protrusion 42 and the second press bar 512 correspond to each other as shown in FIG. 7. Once again, the user pushes the press block 51 by that the second press bar 512 pushes the obstructing protrusion 42 into the rear support rod 4 so that the user can push downward the pushing handle 2 to make the connecting holder block 5 slide down smoothly as shown in FIG. 8 so as to collapse the stroller completely as shown in FIG. 10.

When one wants to extend the collapsed stroller for use, he can lift the pushing handle 2 upward; in doing this, the connecting rod 61 is moved to pull the connecting holder block 5 upward and the first and second sloped guide surfaces 53,54 of the block 5 help the block 5 easily pass over the obstructing protrusion 42 and the protrusion 42 being urged by the reed connected thereto to protrude above the surface of the rear support rod 4 again after the holder block 5 pass thereover.

From the above description, it can be understood the stroller of the present invention has the following advantages.

1. If a person pushes the press block 51 unwarily while a baby is sitting or lying on the stroller, the connecting holder block 5 will slide down a little and the obstructing protrusion 42 will protrude out of the hole 52. As the press block 51 do not have any elastic counteraction force, it keeps the second press bar 512 blocking the connecting holder block 5 and setting the second press bar 512 connect to the obstructing protrusion 42 so as to avoid unwarily collapsing of the stroller and risk of baby injury.

2. The front and rear wheels 31,43 can touch the ground at the same time after collapsing of the stroller so that the collapsed stroller does not have to be leaned over a wall or put to lie on the ground, preventing the possibility of dirtying the bed cloth of the stroller as shown in FIG. 10.

What is claimed is:

1. A folding structure for a collapsible stroller, comprising:

a pair of pivotal connectors;

a pair of spaced front support rods respectively coupled to said pair of pivotal connectors, each of said front support rods having a front wheel coupled to a first end thereof and a second end pivotally coupled to a respective one of said pair of pivotal connectors;

a pair of spaced rear support rods, each of said rear support rods having a rear wheel coupled to a first end thereof and a second end pivotally coupled to a respective one of said pair of pivotal connectors, each of said rear support rods having a spring biased protrusion extending through a hole formed in said rear support rod;

a pushing handle having opposing ends thereof respectively coupled to said pair of pivotal connectors;

a pair of connecting holder blocks respectively movably connected to said pair of rear support rods, said pair of connecting holder blocks being respectively blocked from displacement by said spring biased protrusions, each of said connecting holder blocks having a hole formed therethrough;

a pair of press blocks respectively pivotally coupled to said pair of connecting holder blocks, each of said press blocks having a first press bar disposed in aligned relationship with a corresponding one of said spring biased protrusions, and a second press bar spaced from said first press bar and aligned with said hole of a corresponding one of said pair of connecting holder blocks, wherein pressing said press blocks respectively displaces said second press bars into said holes in said connecting holder blocks and displaces said first press bars to depress said protrusions and unblock said connecting holder blocks and slide said connecting holder blocks along said rear support rods until said protrusions respectively pass through said holes in said connecting holder blocks and contact a corresponding one of said second press bars and thereby prevent inadvertent collapse of said stroller, subsequent pulling of said press blocks respectively displaces said second press bars from said holes in said connecting holder blocks and thereby respectively align said second press bars with said protrusions, whereby a subsequent second pressing of said press blocks respectively displaces said second press bars to depress said protrusions to free said connecting holder blocks to slide said connecting holder blocks along said rear support rods and collapse said stroller.

2. The folding structure as recited in claim 1 further comprising:

a pair of first connecting rods, each of said first connecting rods having one end pivotally coupled to a respective one of said front support rods and an opposing end pivotally coupled to a respective one of said connecting holder blocks; and, a pair of second connecting rods, each of said second connecting rods having one end pivotally coupled to a respective one of said rear support rods and an opposing end pivotally coupled to a respective one of said connecting holder blocks.

3. The folding structure as recited in claim 1 further comprising a chair back frame pivotally coupled to said pair of connecting holder blocks.

* * * * *